(12) United States Patent
Hirao et al.

(10) Patent No.: US 10,329,457 B2
(45) Date of Patent: Jun. 25, 2019

(54) CONDUCTIVE PRESSURE-SENSITIVE ADHESIVE TAPE

(71) Applicant: NITTO DENKO CORPORATION, Ibaraki-shi, Osaka (JP)

(72) Inventors: Akira Hirao, Ibaraki (JP); Ryo Morioka, Ibaraki (JP)

(73) Assignee: NITTO DENKO CORPORATION, Ibaraki-shi, Osaka (JP)

( * ) Notice: Subject to any disclaimer, the term of this patent is extended or adjusted under 35 U.S.C. 154(b) by 0 days.

(21) Appl. No.: 15/705,492

(22) Filed: Sep. 15, 2017

(65) Prior Publication Data

US 2018/0086946 A1 Mar. 29, 2018

(30) Foreign Application Priority Data

Sep. 29, 2016 (JP) .................................. 2016-190595

(51) Int. Cl.
| | | |
|---|---|---|
| *B32B 7/02* | (2019.01) | |
| *C09J 11/04* | (2006.01) | |
| *C09J 9/02* | (2006.01) | |
| *C09J 7/38* | (2018.01) | |
| *C09J 7/28* | (2018.01) | |
| *C08K 3/08* | (2006.01) | |
| *C08K 7/18* | (2006.01) | |
| *C08K 9/02* | (2006.01) | |

(52) U.S. Cl.
CPC ................. *C09J 11/04* (2013.01); *C09J 7/28* (2018.01); *C09J 7/38* (2018.01); *C09J 7/385* (2018.01); *C09J 9/02* (2013.01); *C08K 3/08* (2013.01); *C08K 7/18* (2013.01); *C08K 9/02* (2013.01); *C08K 2201/001* (2013.01); *C08K 2201/005* (2013.01); *C09J 2203/326* (2013.01); *C09J 2205/102* (2013.01); *C09J 2400/163* (2013.01); *C09J 2433/00* (2013.01)

(58) Field of Classification Search
CPC ........ C08K 2201/001; C08K 2201/005; C08K 3/08; C08K 7/18; C08K 9/02; C09J 11/04; C09J 2203/326; C09J 2205/102; C09J 2400/163; C09J 2433/00; C09J 7/0217; C09J 7/0292; C09J 7/28; C09J 7/38; C09J 9/02
See application file for complete search history.

(56) References Cited

U.S. PATENT DOCUMENTS

2010/0209699 A1 8/2010 Nakayama et al.
2013/0344274 A1* 12/2013 Fukuhara ................ B32B 27/36
428/41.4

FOREIGN PATENT DOCUMENTS

| JP | 2004-263030 A | 9/2004 |
| JP | 2005-277145 A | 10/2005 |
| JP | 5291316 B2 | 9/2013 |

OTHER PUBLICATIONS

Nakayama et al (JP 5291316 machine translation), 2013.*

* cited by examiner

*Primary Examiner* — Lawrence D Ferguson
(74) *Attorney, Agent, or Firm* — Hauptman Ham, LLP (57) ABSTRACT

Provided is a conductive pressure-sensitive adhesive tape having high flexibility. The conductive pressure-sensitive adhesive tape includes: a base material; and a pressure-sensitive adhesive layer arranged on at least one surface side of the base material, in which the tape has a total thickness of 30 μm or less.

7 Claims, 3 Drawing Sheets

CONDUCTIVE PRESSURE-SENSITIVE ADHESIVE TAPE

This application claims priority under 35 U.S.C. Section 119 to Japanese Patent Application No. 2016-190595 filed on Sep. 29, 2016, which is herein incorporated by references.

BACKGROUND OF THE INVENTION

1. Field of the Invention

The present invention relates to a conductive pressure-sensitive adhesive tape.

2. Description of the Related Art

A conductive pressure-sensitive adhesive tape (including a conductive pressure-sensitive adhesive sheet) has heretofore been used in applications, such as electromagnetic shielding applications for electrical and electronic equipment, and cables, and grounding for static protection. As such conductive pressure-sensitive adhesive tape, for example, there has been known a pressure-sensitive adhesive tape in which a pressure-sensitive adhesive layer formed of a conductive pressure-sensitive adhesive obtained by dispersing a conductive filler, such as nickel powder, in a pressure-sensitive adhesive substance is arranged on a conductive base material, such as a metal foil (see Japanese Patent Application Laid-open No. 2004-263030 and Japanese Patent Application Laid-open No. 2005-277145).

In recent years, when a conductive pressure-sensitive adhesive tape is used as a material forming a device required to have high flexibility, such as a flexible OLED or a wearable device for health care, the conductive pressure-sensitive adhesive tape has also been required to have high flexibility.

The high flexibility in the conductive pressure-sensitive adhesive tape is specifically, for example, such high bending resistance that the performance of the conductive pressure-sensitive adhesive tape can be maintained even when the tape is repeatedly bent. Such performance of the conductive pressure-sensitive adhesive tape is, for example, as described below. The tape can of course express sufficient conductivity in a Z-axis direction, and can express sufficient conductivity in X- and Y-axis directions effective for circuit connection and the like.

There is a related art document reporting a technology concerning a conductive pressure-sensitive adhesive tape in which the recent downsizing and thinning of electrical and electronic equipment are taken into consideration (see Japanese Patent No. 5291316), though there is no disclosure or suggestion of the bending resistance in the related art document. The technology relates to a conductive pressure-sensitive adhesive tape expressing the following effects. The tape is excellent in pressure-sensitive adhesive property and conductivity even when its pressure-sensitive adhesive layer is thinned, and the tape has such an excellent step absorbing property that even when the tape is bonded to a step, its "floating" from the adherend does not occur. The technology typically relates to a conductive pressure-sensitive adhesive tape including, on at least one surface side of a base material formed of a metal foil, a pressure-sensitive adhesive layer formed of a specific conductive filler-containing pressure-sensitive adhesive serving as a pressure-sensitive adhesive layer, in which: the pressure-sensitive adhesive layer has a thickness of from 10 μm to 30 μm (from 15 μm to 25 μm in Examples); and the base material formed of the metal foil has a thickness of from 10 μm to 100 μm (40 μm in Examples). In the conductive pressure-sensitive adhesive tape, the expression of the effects has been observed under a state in which such a high level of thinning that its total thickness is about 60 μm is achieved. In view of the foregoing, the bending resistance of the conductive pressure-sensitive adhesive tape was determined. As a result, it was found that after the tape had been repeatedly bent, its conductivity in X- and Y-axis directions extremely reduced.

SUMMARY OF THE INVENTION

An object of the present invention is to provide a conductive pressure-sensitive adhesive tape having high flexibility.

The inventors of the present invention have made investigations for achieving the object. As a result, the inventors have found that when the total thickness of a conductive pressure-sensitive adhesive tape including a pressure-sensitive adhesive layer on at least one surface side of a base material is designed so as to be at an unconventionally thin level, the following effect can be significantly expressed: high bending resistance. Thus, the inventors have completed the present invention. Further, the inventors have found that the effect can be more significantly expressed particularly by designing the thickness of the base material so that the thickness may be at an extremely thin level that is unconventional.

A conductive pressure-sensitive adhesive tape according to one embodiment of the present invention includes: a base material; and a pressure-sensitive adhesive layer arranged on at least one surface side of the base material, in which the tape has a total thickness of 30 μm or less.

In one embodiment, the base material includes a base material formed of a metal foil.

In one embodiment, the base material formed of the metal foil includes at least one kind selected from a metal foil subjected to a rolling treatment, a metal foil subjected to a vapor deposition treatment, and a metal foil subjected to a sputtering treatment.

In one embodiment, the base material has a thickness of 9 μm or less.

In one embodiment, the pressure-sensitive adhesive layer includes a conductive pressure-sensitive adhesive containing a base polymer and a conductive filler.

In one embodiment, a content of the conductive filler in the conductive pressure-sensitive adhesive is from 14 parts by weight to 45 parts by weight with respect to 100 parts by weight of a total solid content in the conductive pressure-sensitive adhesive except the conductive filler.

In one embodiment, the conductive filler includes a spherical and/or spike-shaped conductive filler having an aspect ratio of from 1.0 to 1.5.

In one embodiment, the conductive filler includes a metal filler and/or a metal-coated filler.

In one embodiment, a particle diameter d50 of the conductive filler is smaller than a thickness of the pressure-sensitive adhesive layer.

In one embodiment, the particle diameter d50 of the conductive filler is from 2 μm to 20 μm.

In one embodiment, a storage modulus of elasticity G' in a range of from 0° C. to 40° C. obtained by a dynamic viscoelasticity test after the conductive pressure-sensitive adhesive has been turned into a cross-linked structure is $1 \times 10^4$ Pa or more and less than $1 \times 10^6$ Pa.

In one embodiment, the base polymer includes an acrylic polymer.

In one embodiment, the acrylic polymer includes a polymer including a (meth)acrylic acid alkyl ester as a monomer main component.

In one embodiment, the (meth)acrylic acid alkyl ester has an alkyl group having 4 to 12 carbon atoms.

In one embodiment, the (meth)acrylic acid alkyl ester includes n-butyl acrylate and/or 2-ethylhexyl acrylate.

In one embodiment, a content of the (meth)acrylic acid alkyl ester with respect to a total amount of monomer components forming the acrylic polymer is 50 wt % or more.

In one embodiment, the acrylic polymer includes an acrylic polymer obtained from monomer components formed of 20 wt % to 50 wt % of 2-ethylhexyl acrylate, 40 wt % to 79 wt % of n-butyl acrylate, and 1 wt % to 10 wt % of acrylic acid.

In one embodiment, the pressure-sensitive adhesive layer has a thickness of 20 μm or less.

In one embodiment, the tape includes the pressure-sensitive adhesive layer on each of both surface sides of the base material.

According to the present invention, the conductive pressure-sensitive adhesive tape having high flexibility can be provided. In particular, according to the present invention, there can be provided a conductive pressure-sensitive adhesive tape that can express such high bending resistance that even when the tape is repeatedly bent, the tape can express sufficient conductivity in a Z-axis direction, and can also express sufficient conductivity in X- and Y-axis directions.

DESCRIPTION OF THE EMBODIMENTS

When the expression "weight" is used in this specification, the expression may be replaced with "mass" that has been commonly used as an SI unit representing a weight.

When reference is made to the phrase "repeatedly bent" in this specification, unless otherwise stated, the phrase means a state when bending is repeatedly performed by applying a "bending test" performed in each of the evaluations of Examples and Comparative Examples.

In this specification, the expression "(meth)acrylic" means "acrylic and/or methacrylic", the expression "(meth)acrylate" means "acrylate and/or methacrylate", the expression "(meth)allyl" means "allyl and/or methallyl", and the expression "(meth)acrolein" means "acrolein and/or methacrolein".

A conductive pressure-sensitive adhesive tape of the present invention includes a pressure-sensitive adhesive layer on at least one surface side of a base material. That is, the conductive pressure-sensitive adhesive tape of the present invention may be a single-sided pressure-sensitive adhesive tape including the pressure-sensitive adhesive layer only on one surface side of the base material, or may be a double-sided pressure-sensitive adhesive tape including the pressure-sensitive adhesive layer on each of both surface sides of the base material.

The "conductive pressure-sensitive adhesive tape" in the present invention includes a tape in the form of a sheet, i.e., a "conductive pressure-sensitive adhesive sheet."

Figure 1:
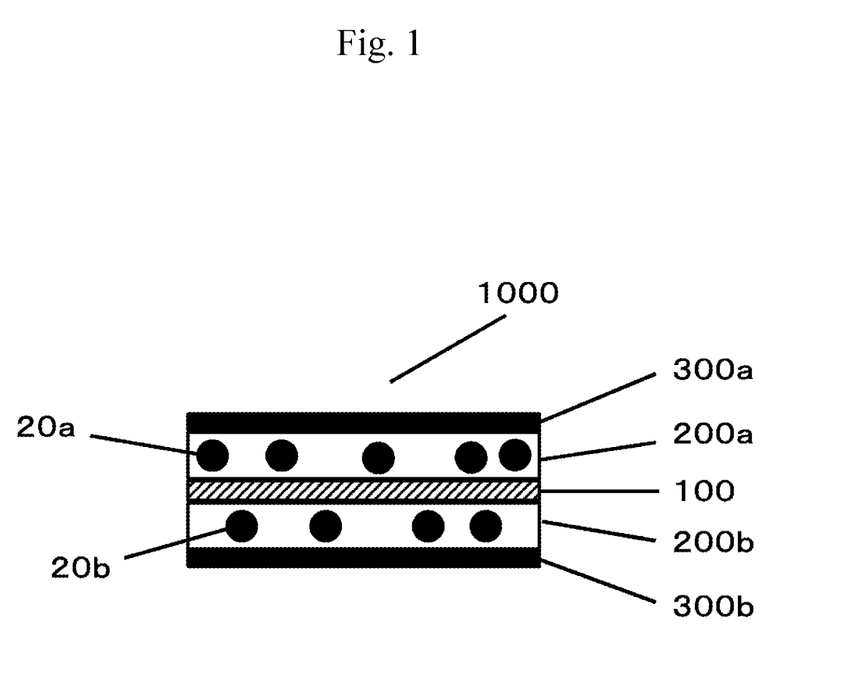
FIG. 1 is a schematic sectional view of a conductive pressure-sensitive adhesive tape according to one embodiment of the present invention.

FIG. 1 is a schematic sectional view of a conductive pressure-sensitive adhesive tape according to one embodiment of the present invention. In FIG. 1, a conductive pressure-sensitive adhesive tape 1000 includes pressure-sensitive adhesive layers 200a, 200b on both surfaces of a base material 100. As illustrated in FIG. 1, the pressure-sensitive adhesive layers 200a, 200b preferably contain such conductive fillers 20a, 20b as described later, respectively. As illustrated in FIG. 1, the conductive pressure-sensitive adhesive tape of the present invention may include, on the surfaces of the pressure-sensitive adhesive layers opposite to the base material, release liners (300a, 300b in FIG. 1) from the viewpoints of, for example, the protection of the surfaces of the pressure-sensitive adhesive layers and the prevention of blocking.

The release liners are typically peeled at the time of the use of the tape. Examples of the release liners include: a base material including a release layer, such as a plastic film or paper, having a surface treated with a release agent based on, for example, a silicone, a long chain alkyl, fluorine, or molybdenum sulfide; a low adhesive base material formed of a fluorine-based polymer, such as polytetrafluoroethylene, polychlorotrifluoroethylene, polyvinyl fluoride, polyvinylidene fluoride, a tetrafluoroethylene-hexafluoropropylene copolymer, or a chlorofluoroethylene-vinylidene fluoride copolymer; and a low adhesive base material formed of a non-polar polymer, such as an olefin-based resin (e.g., polyethylene or polypropylene).

The total thickness of the conductive pressure-sensitive adhesive tape of the present invention is 30 μm or less, preferably 28 μm or less, more preferably 25 μm or less, still more preferably 23 μm or less. A lower limit value for the total thickness of the conductive pressure-sensitive adhesive tape of the present invention is preferably 1 μm or more, more preferably 3 μm or more, still more preferably 5 μm or more in terms of its handleability. When the total thickness of the conductive pressure-sensitive adhesive tape of the present invention falls within the range, an unconventional level of thinning is achieved, and the tape can express such high bending resistance that even when the tape is repeatedly bent, the tape can express sufficient conductivity in a Z-axis direction, and can also express sufficient conductivity in X- and Y-axis directions.

The base material is preferably a base material formed of a metal foil. Any appropriate metal foil may be adopted as the metal foil to the extent that the effects of the present invention are not impaired as long as the metal foil is made of a material having conductivity. Examples of such metal foil include a copper foil, an aluminum foil, a nickel foil, a silver foil, an iron foil, and a foil of an alloy thereof. Of those, an aluminum foil or a copper foil is preferred from the viewpoints of, for example, cost and processability.

The thickness of the base material is 9 μm or less, preferably 8 μm or less, more preferably 7 μm or less, still more preferably 5 μm or less, particularly preferably 3 μm or less. A lower limit value for the thickness of the base material is preferably 0.1 μm or more, more preferably 0.3 μm or more, still more preferably 0.5 μm or more, particularly preferably 0.7 μm or more, most preferably 1 μm or more in terms of its handleability.

In the conductive pressure-sensitive adhesive tape of the present invention, the thickness of the base material is preferably at an extremely thin level beyond the realm of a mere design matter as compared to the thickness (typically around 40 μm) of a base material included in a conventional conductive pressure-sensitive adhesive tape. When the thickness of the base material in the conductive pressure-sensitive adhesive tape of the present invention is made extremely thin as described above, the tape can express such higher bending resistance that even when the tape is repeatedly bent, the tape can express more sufficient conductivity in the Z-axis direction, and can also express more sufficient conductivity in the X- and Y-axis directions. Here, for example, when only the metal foil (e.g., a copper foil) serving as the base material is repeatedly bent, irrespective of whether the thickness of the base material is at an extremely thin level (9 μm or less) or at a level thicker than the foregoing, the tape can express sufficient conductivity in the Z-axis direction, and can also express sufficient conductivity in the X- and Y-axis directions. Interestingly, however, the following has been found. In the case where a conductive pressure-sensitive adhesive tape, which is formed by arranging such a pressure-sensitive adhesive layer as described later on at least one surface side of a base material, is repeatedly bent, when the thickness of the base material is at an extremely thin level (9 μm or less), the tape can express sufficient conductivity in the Z-axis direction, and can also express sufficient conductivity in the X- and Y-axis directions. Meanwhile, however, when the thickness of the base material is at a level thicker than the foregoing, the tape can express sufficient conductivity in the Z-axis direction, but cannot express sufficient conductivity in the X- and Y-axis directions.

The base material having such an extremely thin thickness as described above is, for example, a base material formed of a metal foil, and an ultrathin metal foil obtained by a predetermined method may be adopted. Such ultrathin metal foil is, for example, at least one kind selected from a metal foil subjected to a rolling treatment (e.g., a rolled copper foil), a metal foil subjected to a vapor deposition treatment (e.g., a vapor-deposited copper foil), and a metal foil subjected to a sputtering treatment.

The pressure-sensitive adhesive layer preferably includes a conductive pressure-sensitive adhesive containing a base polymer and a conductive filler. The conductive pressure-sensitive adhesive may contain a tackifying resin, a cross-linking agent, or any other additive as required.

The thickness of the pressure-sensitive adhesive layer is preferably 20 μm or less, more preferably 18 μm or less, still more preferably 16 μm or less, particularly preferably 14 μm or less, most preferably 12 μm or less. A lower limit value for the thickness of the pressure-sensitive adhesive layer is preferably 0.1 μm or more, more preferably 1 μm or more, still more preferably 3 μm or more, particularly preferably 5 μm or more, most preferably 7 μm or more in terms of its handleability. When the thickness of the pressure-sensitive adhesive layer of the conductive pressure-sensitive adhesive tape of the present invention falls within the range, an unconventional level of thinning is achieved to a larger extent, and the tape can express such higher bending resistance that even when the tape is repeatedly bent, the tape can express more sufficient conductivity in the Z-axis direction, and can also express more sufficient conductivity in the X- and Y-axis directions. When the thickness of the pressure-sensitive adhesive layer is extremely large, there is a risk in that the total thickness of the conductive pressure-sensitive adhesive tape of the present invention increases, and hence the effects of the present invention cannot be expressed. When the thickness of the pressure-sensitive adhesive layer is extremely small, in the case where the conductive pressure-sensitive adhesive contains the conductive filler, the conductive filler may become larger than the thickness of the pressure-sensitive adhesive layer to form a protrusion on the surface of the pressure-sensitive adhesive layer. Accordingly, an area of contact between the pressure-sensitive adhesive layer and an adherend may reduce to reduce the pressure-sensitive adhesive property of the layer, and the external appearance of the layer may be unsatisfactory.

Any appropriate polymer may be adopted as the base polymer to the extent that the effects of the present invention are not impaired. Examples of such polymer include: rubber-based polymers, such as a natural rubber and various synthetic rubbers (e.g., a polyisoprene rubber, a styrene-butadiene (SB) rubber, a styrene-isoprene (SI) rubber, a styrene-isoprene-styrene block copolymer (SIS) rubber, a styrene-butadiene-styrene block copolymer (SBS) rubber, a styrene-ethylene-butylene-styrene block copolymer (SEBS) rubber, a styrene-ethylene-propylene-styrene block copolymer (SEPS) rubber, a styrene-ethylene-propylene block copolymer (SEP) rubber, a regenerated rubber, a butyl rubber, polyisobutylene, and modified products thereof); acrylic polymers; silicone-based polymers; and vinyl ester-based polymers.

The base polymer is preferably an acrylic polymer from the viewpoints of durability, weatherability, and heat resistance. That is, the conductive pressure-sensitive adhesive is preferably an acrylic conductive pressure-sensitive adhesive.

The acrylic polymer is preferably a polymer including a (meth)acrylic acid alkyl ester as a monomer main component. In addition to such monomer main component, the polymer preferably contains a carboxyl group-containing monomer as a copolymerizable monomer component. In addition, any other monomer may be further used as required.

Any appropriate (meth)acrylic acid alkyl ester may be adopted as the (meth)acrylic acid alkyl ester to the extent that the effects of the present invention are not impaired as long as the (meth)acrylic acid alkyl ester has an alkyl group having preferably 1 to 12 carbon atoms, more preferably 4 to 12 carbon atoms. Examples of such (meth)acrylic acid alkyl ester include methyl (meth)acrylate, ethyl (meth)acrylate, n-propyl (meth)acrylate, isopropyl (meth)acrylate, n-butyl (meth)acrylate, isobutyl (meth)acrylate, sec-butyl (meth)acrylate, t-butyl (meth)acrylate, pentyl (meth)acrylate, isopentyl (meth)acrylate, neopentyl (meth)acrylate, hexyl (meth)acrylate, heptyl (meth)acrylate, octyl (meth)acrylate, isooctyl (meth)acrylate, 2-ethylhexyl (meth)acrylate, nonyl (meth)acrylate, isononyl (meth)acrylate, decyl (meth)acrylate, isodecyl (meth)acrylate, undecyl (meth)acrylate, and dodecyl (meth)acrylate.

The (meth)acrylic acid alkyl ester is preferably a (meth)acrylic acid alkyl ester having an alkyl group having 4 to 12 carbon atoms, more preferably n-butyl acrylate (BA) or 2-ethylhexyl acrylate (2-EHA) from the viewpoint of its viscoelastic characteristic.

The monomer main components may be used alone or in combination thereof.

In the acrylic polymer, the content of the (meth)acrylic acid alkyl ester serving as the monomer main component with respect to the total amount of monomer components forming the acrylic polymer is preferably 50 wt % or more, more preferably 80 wt % or more, still more preferably 90 wt % or more. An upper limit for the ratio of the monomer main component with respect to the total amount of the monomer components is preferably 99 wt % or less, more preferably 97 wt % or less. When the ratio of the monomer main component with respect to the total amount of the monomer components falls within the range, moderate viscoelasticity is imparted to the pressure-sensitive adhesive layer. When the ratio of the monomer main component with respect to the total amount of the monomer components is excessively small, moderate viscoelasticity may not be obtained.

Examples of the carboxyl group-containing monomer include (meth)acrylic acid, itaconic acid, maleic acid, fumaric acid, and crotonic acid. As the carboxyl group-containing monomer, acid anhydrides of those carboxyl group-containing monomers (e.g., acid anhydride group-containing monomers, such as maleic anhydride and itaconic anhydride) may also be used. The carboxyl group-containing monomers may be used alone or in combination thereof.

The content of the carboxyl group-containing monomer with respect to the total amount of the monomer components is preferably from 1 wt % to 10 wt %, more preferably from 3 wt % to 8 wt %. When the content of the carboxyl group-containing monomer with respect to the total amount of the monomer components falls within the range, a satisfactory adhesive property with an adherend can be secured, and satisfactory applicability can be secured. When the content of the carboxyl group-containing monomer with respect to the total amount of the monomer components is excessively small, it may be impossible to secure a satisfactory adhesive property with the adherend. When the content of the carboxyl group-containing monomer with respect to the total amount of the monomer components is excessively large, a problem, such as unsatisfactory applicability due to an increase in viscosity of the pressure-sensitive adhesive of the pressure-sensitive adhesive layer, may occur.

Examples of the other monomer include: functional monomers, such as hydroxyl group-containing monomers (e.g., hydroxyethyl (meth)acrylate, hydroxypropyl (meth)acrylate, and hydroxybutyl (meth)acrylate), epoxy group-containing acrylic monomers (e.g., glycidyl (meth)acrylate and methylglycidyl (meth)acrylate), glycerin di(meth)acrylate, and 2-methacryloyloxyethyl isocyanate; polyfunctional monomers, such as triethylene glycol diacrylate, ethylene glycol dimethacrylate, and trimethylolpropane tri(meth)acrylate; nonaromatic ring-containing (meth)acrylic acid esters, such as a (meth)acrylic acid cycloalkyl ester, for example, cyclohexyl (meth)acrylate, and isobornyl (meth)acrylate; aromatic ring-containing (meth)acrylic acid esters, such as a (meth)acrylic acid aryl ester (e.g., phenyl (meth)acrylate), a (meth)acrylic acid aryloxyalkyl ester (e.g., phenoxyethyl (meth)acrylate), and a (meth)acrylic acid arylalkyl ester (e.g., (meth)acrylic acid benzyl ester); vinyl ester-based monomers, such as vinyl acetate and vinyl propionate; styrene-based monomers, such as styrene and α-methylstyrene; olefin-based monomers, such as ethylene, propylene, isoprene, and butadiene; and vinyl ether-based monomers, such as vinyl ether.

The content of the other monomer with respect to the total amount of the monomer components is preferably less than 10 wt %.

The acrylic polymer to be used as the base polymer is particularly preferably an acrylic polymer obtained from monomer components formed of 20 wt % to 50 wt % of 2-ethylhexyl acrylate, 40 wt % to 79 wt % of n-butyl acrylate, and 1 wt % to 10 wt % of acrylic acid from the viewpoint of, for example, the viscoelastic characteristic of the pressure-sensitive adhesive layer.

The acrylic polymer may be prepared by any appropriate polymerization method to the extent that the effects of the present invention are not impaired. Examples of such polymerization method include a solution polymerization method, an emulsion polymerization method, a bulk polymerization method, and a polymerization method based on UV irradiation. Of those, a solution polymerization method is suitable in terms of filler dispersibility, cost, and the like.

Any appropriate products may be adopted as a polymerization initiator, a chain transfer agent, and the like to be used at the time of the polymerization of the acrylic polymer to the extent that the effects of the present invention are not impaired.

Examples of the polymerization initiator include oil-soluble polymerization initiators, including: azo-based polymerization initiators, such as 2,2'-azobisisobutyronitrile, 2,2'-azobis(4-methoxy-2,4-dimethylvaleronitrile), 2,2'-azobis(2,4-dimethylvaleronitrile), 2,2'-azobis(2-methylbutyronitrile), 1,1'-azobis(cyclohexane-1-carbonitrile), 2,2'-azobis(2,4,4-trimethylpentane), and dimethyl-2,2'-azobis(2-methylpropionate); and peroxide-based polymerization initiators, such as benzoyl peroxide, t-butyl hydroperoxide, di-t-butyl peroxide, t-butyl peroxybenzoate, dicumyl peroxide, 1,1-bis(t-butylperoxy)-3,3,5-trimethylcyclohexane, and 1,1-bis(t-butylperoxy)cyclododecane. The polymerization initiators may be used alone or in combination thereof. The usage amount of the polymerization initiator is preferably from 0.01 wt % to 1 wt % with respect to the total amount of the monomer components.

In the solution polymerization method, various general solvents may be used. Examples of such solvent include organic solvents, for example: esters, such as ethyl acetate and n-butyl acetate; aromatic hydrocarbons, such as toluene and benzene; aliphatic hydrocarbons, such as n-hexane and n-heptane; alicyclic hydrocarbons, such as cyclohexane and methylcyclohexane; and ketones, such as methyl ethyl ketone and methyl isobutyl ketone. The solvents may be used alone or in combination thereof.

The weight-average molecular weight (Mw) of the acrylic polymer is preferably from 300,000 to 1,000,000, more preferably from 400,000 to 800,000 because the effects of the present invention can be expressed to a larger extent. The weight-average molecular weight (Mw) may be controlled by a monomer concentration, a monomer dropping rate, and the like in addition to the kinds and usage amounts of the polymerization initiator and the chain transfer agent, and a temperature and a time period at the time of the polymerization. The weight-average molecular weight may be measured by, for example, a gel permeation chromatography (GPC) method.

Any appropriate conductive filler may be adopted as the conductive filler (conductive particles) to the extent that the effects of the present invention are not impaired. Examples of such conductive filler include: a filler formed of a metal, such as nickel, iron, chromium, cobalt, aluminum, antimony, molybdenum, copper, silver, platinum, or gold, an alloy or oxide thereof, or carbon, such as carbon black; and a filler obtained by coating polymer beads, a resin, glass, or ceramic with any of the above-mentioned materials. Of those, a metal filler and/or a metal-coated filler are preferred, and nickel powder is particularly preferred.

The shape of the conductive filler is a spherical shape and/or a spike shape, preferably a spherical shape. When a spherical and/or spike-shaped conductive filler is used, the filler is uniformly dispersed in the conductive pressure-sensitive adhesive with ease, and hence it becomes easy to achieve both a pressure-sensitive adhesive property and conductivity in the conductive pressure-sensitive adhesive tape of the present invention. When a filament-shaped, flaky, or dendritic filler is used, its dispersibility reduces to turn the filler into a coarse aggregate, or the filler is arranged in a horizontal direction relative to a pressure-sensitive adhesive surface in the pressure-sensitive adhesive layer to make it difficult for the tape to exhibit conductivity in its thickness direction. Accordingly, it may be impossible to achieve both the pressure-sensitive adhesive property and the conductivity in the conductive pressure-sensitive adhesive tape of the present invention. In addition, when the filament-shaped, flaky, or dendritic filler is used, the external appearance of the tape may be unsatisfactory.

The aspect ratio of the conductive filler is preferably from 1.0 to 1.5, more preferably from 1.0 to 1.1. The aspect ratio of the conductive filler may be measured with, for example, a scanning electron microscope (SEM).

The content of the conductive filler in all fillers in the conductive pressure-sensitive adhesive is preferably 90 wt % or more, more preferably 95 wt % or more, still more preferably 99 wt % or more. It is particularly preferred that substantially all (100 wt %) of the fillers be the conductive filler. When the content of the conductive filler in all fillers in the conductive pressure-sensitive adhesive falls within the range, it becomes easier to achieve both the pressure-sensitive adhesive property and the conductivity in the conductive pressure-sensitive adhesive tape of the present invention.

A particle diameter (also referred to as "filler diameter") d50 of the conductive filler is preferably smaller than the thickness of the pressure-sensitive adhesive layer. That is, the following relationship is preferably satisfied: the thickness of the pressure-sensitive adhesive layer>d50. The d50 is a 50% cumulative value (median diameter) in a particle diameter distribution. The d50 is measured by, for example, a laser diffraction/scattering method. When the pressure-sensitive adhesive layer contains two or more kinds of conductive fillers, the d50 is calculated from a distribution in which all conductive fillers are mixed.

When the d50 satisfies the relationship, the pressure-sensitive adhesive layer can achieve both higher conductivity and a more excellent pressure-sensitive adhesive property. When the d50 is equal to or more than the thickness of the pressure-sensitive adhesive layer, one half or more of the particles of the conductive filler become larger than the thickness of the pressure-sensitive adhesive layer to form a protrusion on the surface of the pressure-sensitive adhesive layer. Accordingly, an area of contact between the pressure-sensitive adhesive layer and an adherend may reduce to reduce the pressure-sensitive adhesive property of the layer, and the external appearance of the layer may be unsatisfactory. A specific range of the d50 is preferably from 2 μm to 20 μm, more preferably from 3 μm to 15 μm, still more preferably from 4 μm to 12 μm, particularly preferably from 5 μm to 10 μm.

The conductive filler is available on the market. For example, "Ni123J" (spike-shaped nickel particles) manufactured by INCO may be used.

The content of the conductive filler in the conductive pressure-sensitive adhesive is preferably from 14 parts by weight to 45 parts by weight with respect to 100 parts by weight of the total solid content in the conductive pressure-sensitive adhesive except the conductive filler. When the content of the conductive filler in the conductive pressure-sensitive adhesive falls within the range, it becomes easier to achieve both the pressure-sensitive adhesive property and the conductivity in the conductive pressure-sensitive adhesive tape of the present invention. The expression "total solid content in the conductive pressure-sensitive adhesive except the conductive filler" refers to a solid content obtained by excluding the conductive filler in the conductive pressure-sensitive adhesive from the total solid content of the conductive pressure-sensitive adhesive.

A tackifying resin may be added to the conductive pressure-sensitive adhesive from the viewpoint of an improvement in pressure-sensitive adhesive property. Examples of the tackifying resin include a terpene-based tackifying resin, a phenol-based tackifying resin, a rosin-based tackifying resin, and a petroleum-based tackifying resin. Of those, a rosin-based tackifying resin is preferred. Those tackifying resins may be used alone or in combination thereof.

Examples of the terpene-based tackifying resin include: terpene-based resins, such as an α-pinene polymer, a β-pinene polymer, and a dipentene polymer; and modified terpene-based resins (e.g., a terpene phenol-based resin, a styrene-modified terpene-based resin, an aromatic-modified terpene-based resin, and a hydrogenated terpene-based resin) obtained by modifying (e.g., phenol-modifying, aromatic-modifying, hydrogenation-modifying, or hydrocarbon-modifying) those terpene-based resins.

Examples of the phenol-based tackifying resin include: condensates (e.g., an alkylphenol-based resin and a xylene-formaldehyde-based resin) of various phenols (e.g., phenol, m-cresol, 3,5-xylenol, p-alkylphenol, and resorcin) with formaldehyde; resol obtained by an addition reaction of any of the phenols with formaldehyde using an alkali catalyst; novolak obtained by a condensation reaction of any of the phenols with formaldehyde using an acid catalyst; and rosin-modified phenol resins obtained by adding phenol to rosins (such as an unmodified rosin, a modified rosin, and various rosin derivatives) using an acid catalyst and subjecting the resultant to heat polymerization.

Examples of the rosin-based tackifying resin include: unmodified rosins (raw rosins), such as a gum rosin, a wood rosin, and a tall oil rosin; modified rosins (e.g., a hydrogenated rosin, a disproportionated rosin, a polymerized rosin, and other chemically modified rosins) obtained by modifying those unmodified rosins by hydrogenation, disproportionation, polymerization, and the like; and various rosin derivatives. Examples of the rosin derivatives include: rosin esters, such as an ester compound of a rosin, which is obtained by esterification of an unmodified rosin with an alcohol, and an ester compound of a modified rosin obtained by esterification of a modified rosin, such as a hydrogenated rosin, a disproportionated rosin, or a polymerized rosin, with an alcohol; unsaturated fatty acid-modified rosins each obtained by modifying an unmodified rosin or a modified rosin (e.g., a hydrogenated rosin, a disproportionated rosin, or a polymerized rosin) with an unsaturated fatty acid; unsaturated fatty acid-modified rosin esters each obtained by modifying a rosin ester with an unsaturated fatty acid; rosin alcohols each obtained by subjecting a carboxyl group in an unmodified rosin, a modified rosin (e.g., a hydrogenated rosin, a disproportionated rosin, or a polymerized rosin), an unsaturated fatty acid-modified rosin, or an unsaturated fatty acid-modified rosin ester to reduction treatment; and metal salts of rosins, such as an unmodified rosin, a modified rosin, and various rosin derivatives (particularly rosin esters).

Examples of the petroleum-based tackifying resin include an aromatic petroleum resin, an aliphatic petroleum resin, an alicyclic petroleum resin (aliphatic cyclic petroleum resin), an aliphatic/aromatic petroleum resin, an aliphatic/alicyclic petroleum resin, a hydrogenated petroleum resin, a coumarone-based resin, and a coumarone-indene-based resin.

Examples of the aromatic petroleum resin include polymers each obtained by using only one kind or two or more kinds of vinyl group-containing aromatic hydrocarbons each having 8 to 10 carbon atoms (such as styrene, o-vinyltoluene, m-vinyltoluene, p-vinyltoluene, α-methylstyrene, β-methylstyrene, indene, and methylindene). As the aromatic petroleum resin, an aromatic petroleum resin (so-called "C9-based petroleum resin") obtained from a fraction (so-called "C9 petroleum fraction"), such as vinyltoluene or indene, may be suitably used.

Examples the aliphatic petroleum resin include polymers each obtained by using only one kind or two or more kinds of olefins or dienes each having 4 or 5 carbon atoms (e.g., olefins, such as butene-1, isobutylene, and pentene-1; and dienes, such as butadiene, piperylene (1,3-pentadiene), and isoprene). As the aliphatic petroleum resin, an aliphatic petroleum resin (so-called "C4-based petroleum resin", "C5-based petroleum resin", or the like) obtained from a fraction (so-called "C4 petroleum fraction", "C5 petroleum fraction", or the like), such as butadiene, piperylene, or isoprene, may be suitably used.

Examples of the alicyclic petroleum resin include an alicyclic hydrocarbon-based resin obtained by subjecting an aliphatic petroleum resin (so-called "C4-based petroleum resin", "C5-based petroleum resin", or the like) to cyclodimerization and then polymerization, a polymer of a cyclic diene compound (e.g., cyclopentadiene, dicyclopentadiene, ethylidene norbornene, dipentene, ethylidene bicycloheptene, vinylcycloheptene, tetrahydroindene, vinylcyclohexene, or limonene) or a hydrogenated product thereof, and an alicyclic hydrocarbon-based resin obtained by hydrogenation of an aromatic ring of an aromatic hydrocarbon resin or an aliphatic/aromatic petroleum resin. Examples of the aliphatic/aromatic petroleum resin include styrene-olefin-based copolymers. As the aliphatic/aromatic petroleum resin, for example, a so-called "C5/C9 copolymer-based petroleum resin" may be used.

A commercial product may be used as the tackifying resin, and for example, a product available under the product name "HARIESTER" from Harima Chemicals, Inc., a product available under the product name "ESTER GUM" or "PENSEL" from Arakawa Chemical Industries, Ltd., or a product available under the product name "RIKATACK" from Rika Fine-tech Inc. may be used.

The content of the tackifying resin in the conductive pressure-sensitive adhesive is preferably from 10 wt % to 50 wt %, more preferably from 15 wt % to 45 wt % with respect to the total solid content of the base polymer (e.g., the acrylic polymer) from the viewpoint of an improvement in pressure-sensitive adhesive property.

A cross-linking agent is preferably added to the conductive pressure-sensitive adhesive to be used in the pressure-sensitive adhesive layer from the viewpoint of controlling the gel fraction (ratio of a solvent-insoluble matter) of the pressure-sensitive adhesive layer. Examples of the cross-linking agent include an isocyanate-based cross-linking agent, an epoxy-based cross-linking agent, a melamine-based cross-linking agent, a peroxide-based cross-linking agent, a urea-based cross-linking agent, a metal alkoxide-based cross-linking agent, a metal chelate-based cross-linking agent, a metal salt-based cross-linking agent, a carbodiimide-based cross-linking agent, an oxazoline-based cross-linking agent, an aziridine-based cross-linking agent, and an amine-based cross-linking agent. Of those, an isocyanate-based cross-linking agent or an epoxy-based cross-linking agent is preferred. The cross-linking agents may be used alone or in combination thereof.

Examples of the isocyanate-based cross-linking agent include: lower aliphatic polyisocyanates, such as 1,2-ethylene diisocyanate, 1,4-butylene diisocyanate, and 1,6-hexamethylene diisocyanate; alicyclic polyisocyanates, such as cyclopentylene diisocyanate, cyclohexylene diisocyanate, isophorone diisocyanate, hydrogenated tolylene diisocyanate, and hydrogenated xylene diisocyanate; aromatic polyisocyanates, such as 2,4-tolylene diisocyanate, 2,6-tolylene diisocyanate, 4,4'-diphenylmethane diisocyanate, and xylylene diisocyanate; and a trimethylolpropane/tolylene diisocyanate adduct (manufactured by Nippon Polyurethane Industry Co., Ltd., product name: "CORONATE L"), and a trimethylolpropane/hexamethylene diisocyanate trimer adduct (manufactured by Nippon Polyurethane Industry Co., Ltd., product name: "CORONATE HL").

Examples of the epoxy-based cross-linking agent include N,N,N',N'-tetraglycidyl-m-xylenediamine, diglycidylaniline, 1,3-bis(N,N-glycidylaminomethyl)cyclohexane, 1,6-hexanediol diglycidyl ether, neopentyl glycol diglycidyl ether, ethylene glycol diglycidyl ether, propylene glycol diglycidyl ether, polyethylene glycol diglycidyl ether, polypropylene glycol diglycidyl ether, sorbitol polyglycidyl ether, glycerol polyglycidyl ether, pentaerythritol polyglycidyl ether, polyglycerol polyglycidyl ether, sorbitan polyglycidyl ether, trimethylolpropane polyglycidyl ether, adipic acid diglycidyl ester, o-phthalic acid diglycidyl ester, triglycidyl-tris(2-hydroxyethyl)isocyanurate, resorcin diglycidyl ether, bisphenol-S-diglycidyl ether, and an epoxy-based resin having two or more epoxy groups in a molecule.

The content of the cross-linking agent in the conductive pressure-sensitive adhesive is preferably from 0.001 wt % to 10 wt % with respect to the total solid content of the base polymer (e.g., the acrylic polymer) because the effects of the present invention can be expressed to a larger extent.

Any other additive, such as an age resistor, a filler, a colorant (e.g., a pigment or a dye), a UV absorber, an antioxidant, a plasticizer, a softener, a surfactant, or a rust inhibitor (e.g., benzotriazole, tolyltriazole, or diisopropylammonium benzoate), may be incorporated in any appropriate amount into the conductive pressure-sensitive adhesive as required to the extent that the effects of the present invention are not impaired.

The conductive pressure-sensitive adhesive may be used as a solution (pressure-sensitive adhesive solution) after its viscosity has been appropriately regulated with any one of various general solvents. Examples of such solvent include organic solvents, for example: esters, such as ethyl acetate and n-butyl acetate; aromatic hydrocarbons, such as toluene and benzene; aliphatic hydrocarbons, such as n-hexane and n-heptane; alicyclic hydrocarbons, such as cyclohexane and methylcyclohexane; and ketones, such as methyl ethyl ketone and methyl isobutyl ketone. The solvents may be used alone or in combination thereof.

A storage modulus of elasticity G' in the range of from 0° C. to 40° C. obtained by a dynamic viscoelasticity test after the conductive pressure-sensitive adhesive has been turned into a cross-linked structure (i.e., the state of the pressure-sensitive adhesive layer) is preferably $1 \times 10^4$ Pa or more and less than $1 \times 10^6$ Pa. When the G' is less than $1 \times 10^4$ Pa, the pressure-sensitive adhesive layer may become so soft as to be poor in cohesive strength. Meanwhile, when the G' is $1 \times 10^6$ Pa or more, there is a risk in that the pressure-sensitive adhesive layer becomes harder and hence its bonding workability remarkably reduces. In addition, the peak temperature of a loss tangent tan δ after the curing of the conductive pressure-sensitive adhesive is preferably 0° C. or less, more preferably −10° C. or less. When the peak temperature of the tan δ is more than 0° C., there is a risk in that the pressure-sensitive adhesive layer becomes harder at low temperatures, and hence its bonding workability remarkably reduces.

Any appropriate method may be adopted as a method of forming the pressure-sensitive adhesive layer to the extent that the effects of the present invention are not impaired. Examples of such method include: a method involving applying the conductive pressure-sensitive adhesive (or a conductive pressure-sensitive adhesive solution obtained by turning the pressure-sensitive adhesive into a solution with an organic solvent or the like) onto a predetermined surface (e.g., a base material surface) so that its thickness after drying may be a predetermined thickness, and drying the pressure-sensitive adhesive as required to cure the pressure-sensitive adhesive (direct transfer method); and a method involving applying the conductive pressure-sensitive adhesive (or a conductive pressure-sensitive adhesive solution obtained by turning the pressure-sensitive adhesive into a solution with an organic solvent or the like) onto an appropriate release liner so that its thickness after drying may be a predetermined thickness, drying the pressure-sensitive adhesive as required to cure the pressure-sensitive adhesive to form a pressure-sensitive adhesive layer, and then transferring the pressure-sensitive adhesive layer onto a predetermined surface (e.g., a base material surface) (transfer method). At the time of the application of the conductive pressure-sensitive adhesive (or a conductive pressure-sensitive adhesive solution obtained by turning the pressure-sensitive adhesive into a solution with an organic solvent or the like), a commonly used coater (e.g., a gravure roll coater, a reverse roll coater, a kiss-roll coater, a dip roll coater, a bar coater, a knife coater, or a spray coater) may be used.

The pressure-sensitive adhesive strength (to a SUS plate, 180° peeling) of the pressure-sensitive adhesive layer in the conductive pressure-sensitive adhesive tape of the present invention is preferably from 3 N/25 mm to 20 N/25 mm, more preferably from 5 N/25 mm to 17 N/25 mm, still more preferably from 7 N/25 mm to 15 N/25 mm, particularly preferably from 9 N/25 mm to 13 N/25 mm.

The conductive pressure-sensitive adhesive tape of the present invention has high flexibility, and is hence suitably used in applications including a device required to have high flexibility, such as a flexible OLED or a wearable device for health care.

EXAMPLES

Now, the present invention is described specifically by way of Examples. However, the present invention is by no means limited to Examples. Test and evaluation methods in Examples and the like are as described below. The term "part(s)" in the following description means "part(s) by weight" unless otherwise specified, and the term "%" in the following description means "wt %" unless otherwise specified.

(Filler Diameter d50)

A filler diameter d50 was measured with a laser diffraction/scattering Microtrac particle size distribution-measuring apparatus MT3300 (manufactured by Nikkiso Co., Ltd.). Water (refractive index: 1.33) was used as a solvent, and a sample (filler) was added thereto so that a sample concentration fell within the range of a dv value (dimensionless value obtained from the quantity of scattered light obtained from measured particles) (the numerical value was proportional to the volume of particles in a measuring portion and served as a guideline in the Microtrac for determining a measurement concentration) of from 0.02 to 0.5. The mixture was irradiated with an ultrasonic wave for 3 minutes by using an ultrasonic apparatus (output: 40 W), and the measurement was performed while the mixture was circulated at a flow rate of 70% (35 cc/min).

(Thickness of Pressure-Sensitive Adhesive Layer (In Conformity with JIS Z 0237))

A dial gauge specified in JIS B 7503 was used in the measurement of the thickness of a pressure-sensitive adhesive layer. The contact surface of the dial gauge was a flat surface, and its diameter was set to 5 mm. A test piece having a width of 150 mm was used, and thicknesses at five points arranged at equal intervals in its widthwise direction were measured with a dial gauge having a scale of $1/1,000$ mm.

(Aspect Ratio of Conductive Filler)

Measurement was performed with a scanning electron microscope (FE-SEM) (manufactured by Hitachi High-Technologies Corporation, "S-4800"). A sample (filler) was directly fixed to a sample stage and subjected to Pt—Pd sputtering for 25 seconds. The resultant was observed at an acceleration voltage of 1 kV in a secondary electron image. A ratio between the minor axis and major axis of each of 10 filler particles (that did not aggregate) randomly selected from the resultant electron image was measured, and the ratio of the length of the major axis to the length of the minor axis was defined as an aspect ratio. The average of the 10 measured values was used as a value for the filler. In the case of a flaky (cylindrical) filler, the ratio of its diameter to its thickness was defined as an aspect ratio. Although the measurement is desirably performed by using a powdery filler (before its addition to a pressure-sensitive adhesive), the measurement may also be performed after the filler has been removed from a pressure-sensitive adhesive layer.

(Pressure-Sensitive Adhesive Strength)

A sample (sample width: 25 mm) of each of conductive pressure-sensitive adhesive tapes obtained in Examples and Comparative Examples was bonded to a stainless-steel plate (SUS304BA plate) under an atmosphere at 23° C. and 60% RH by reciprocating a roller having a weight of 2.0 kg and a width of 30 mm once (bonding length: 100 mm). After the resultant had been left to stand at normal temperature (23° C., 60% RH) for 30 minutes, a 180° peel test was performed with a tensile tester in conformity with JIS Z 0237 at a tensile rate of 300 mm/min to measure a peeling pressure-sensitive adhesive strength (N/25 mm).

(Resistance Value in Z-Axis Direction)

Figure 2:
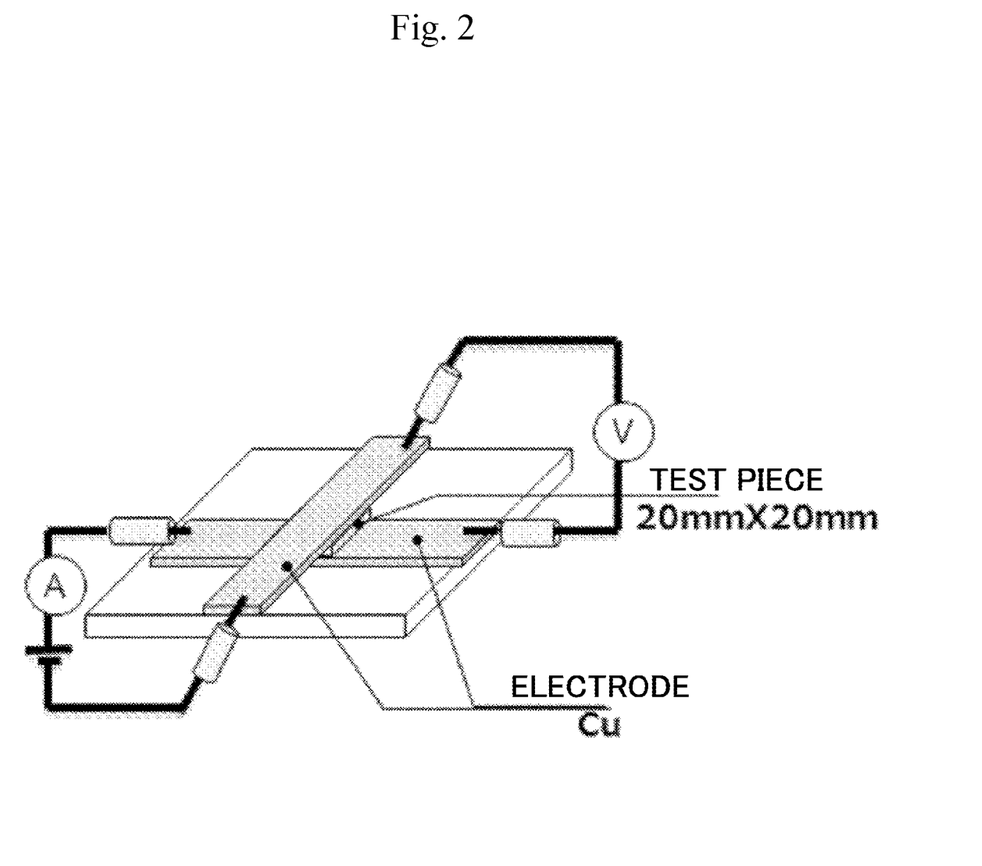
FIG. 2 is a schematic perspective view for illustrating an apparatus for measuring a resistance value in a Z-axis direction.

A test piece measuring 20 mm by 20 mm was cut out of each of the conductive pressure-sensitive adhesive tapes obtained in Examples and Comparative Examples. The test piece was bonded between two rolled copper foils each having a thickness of 35 μm (20 mm×50 mm) crossed at an angle of 90° as illustrated in FIG. 2 under a normal-temperature environment by reciprocating a roller having a weight of 5 kg and a width of 30 mm once so that the area of a bonding portion measured 20 mm by 20 mm. After the bonding, the resultant was left to stand under the normal-temperature environment for 30 minutes or more. After that, a terminal was connected to one end portion (portion to which the test piece was not bonded) of each of the rolled copper foils, and a resistance value (unit: Ω/20 mm×20 mm) between the terminals was measured with a resistance meter (manufactured by Hioki E.E. Corporation, product name: "RESISTANCE METER: R3544-01, TERMINAL: HIOKI L2102").

(Resistance Value in X- and Y-Axis Directions)

Figure 3:
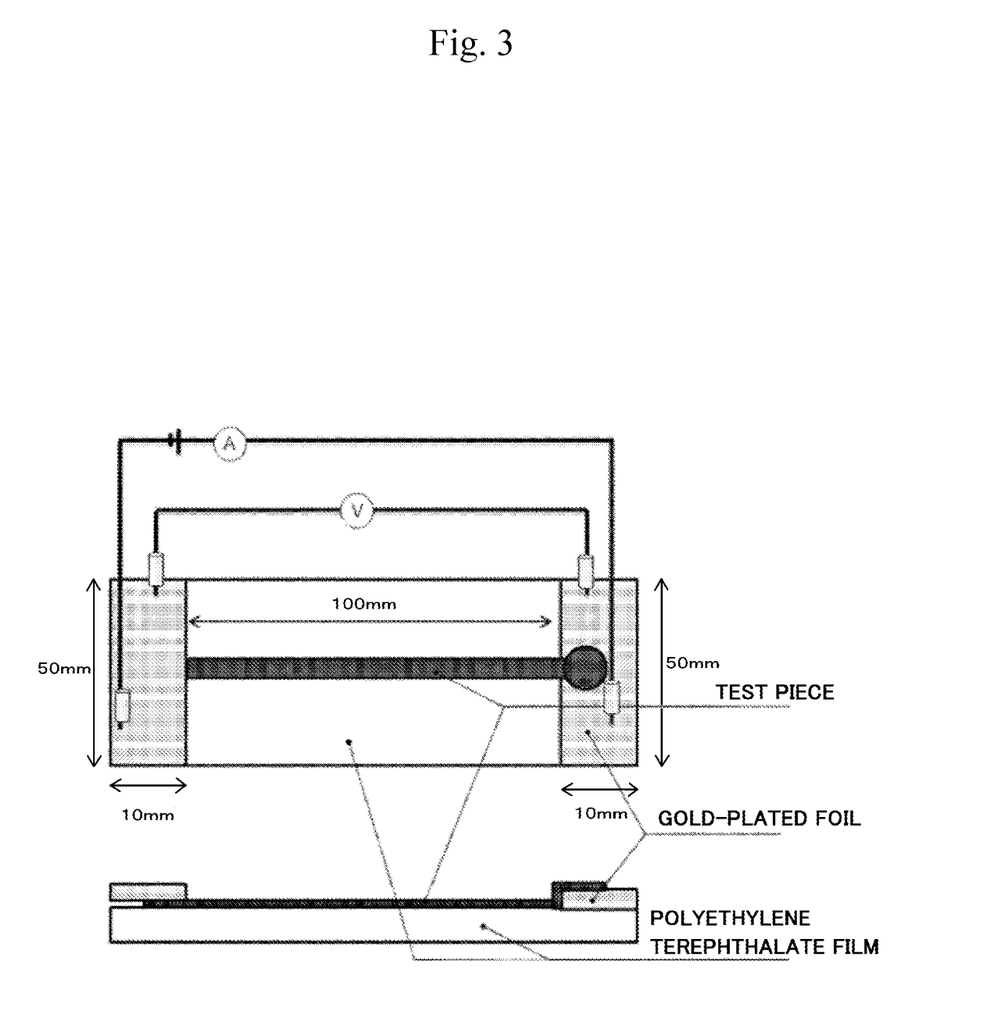
FIG. 3 are a schematic plan view and a schematic sectional view for illustrating an apparatus for measuring a resistance value in X- and Y-axis directions.

A test piece measuring 2 mm by 110 mm (5 mmΦ at both ends) was cut out of each of the conductive pressure-sensitive adhesive tapes obtained in Examples and Comparative Examples. The test piece, gold-plated foils (10 mm×50 mm), which were each obtained by subjecting the other copper surface of a rolled copper foil base material having a thickness of 35 µm that had a polyimide film having a thickness of 25 µm laminated on one of its surfaces to a plating treatment (thickness: 3 µm) with electrolytic nickel and subjecting the plated surface to a plating treatment with electrolytic gold having a thickness of 0.03 µm or more, and a polyethylene terephthalate film having a thickness of 100 µm were arranged as illustrated in FIG. 3, and the gold-plated foils and the 5 mmΦ portions of the test piece at both ends were bonded to each other under a normal-temperature environment by reciprocating a roller having a weight of 5 kg and a width of 30 mm once. After the bonding, the resultant was left to stand under the normal-temperature environment for 30 minutes or more. After that, as illustrated in FIG. 3, a terminal was connected to one end portion (portion to which the test piece was not bonded) of each of the gold-plated foils, and a resistance value (unit: Ω) between the terminals was measured with a resistance meter (manufactured by Hioki E.E. Corporation, product name: "RESISTANCE METER: R3544-01, TERMINAL: HIOKI L2102").

(Bending Test)

A test piece measuring 2 mm by 110 mm (5 mmΦ at both ends) was cut out of each of the conductive pressure-sensitive adhesive tapes obtained in Examples and Comparative Examples. The test piece was placed in a bending tester (manufactured by Yuasa System Co., Ltd., DLDMLH-FS), and its resistance value in X- and Y-axis directions was measured by performing a bending test under the conditions of a distance between surfaces of 10 mm (R=5 mm) and a bending rate of 1 time/sec (60 rpm) 1,000 times.

[Production Example 1]: Production of Conductive Pressure-Sensitive Adhesive Layer 30 Parts by weight of 2-ethylhexyl acrylate, 67 parts by weight of n-butyl acrylate, and 3 parts by weight of acrylic acid were subjected to solution polymerization (65° C.×5 hours, 80° C.×2 hours) by using toluene as a solvent and 0.1 part by weight of azobisisobutyronitrile as an initiator according to an ordinary method. Thus, a solution (final solid content concentration: 40.0 wt %) of an acrylic polymer having a weight-average molecular weight of about 500,000 was obtained.

35 Parts by weight of a polymerized rosin pentaerythritol ester (manufactured by Arakawa Chemical Industries, Ltd., "PENSEL D-125") was blended as a tackifying resin with respect to 100 parts by weight of the solid content of the acrylic polymer solution. Thus, an acrylic resin composition solution (solid content concentration: 46.8 wt %) was produced.

25 Parts by weight of nickel powder ("Ni123J" manufactured by INCO, filler diameter d50: 6.7 µm, tap density: 4.08 g/cm$^3$, spike shape), 200 parts by weight of toluene, and 2 parts by weight of an isocyanate cross-linking agent (manufactured by Nippon Polyurethane Industry Co., Ltd., product name: "CORONATE L") were blended with respect to 100 parts by weight of the solid content of the acrylic resin composition solution, and the contents were mixed with a stirrer for 10 minutes. Thus, a solution of a conductive pressure-sensitive adhesive (acrylic pressure-sensitive adhesive solution) was obtained.

A pressure-sensitive adhesive layer was continuously formed as described below. The resultant conductive pressure-sensitive adhesive solution was applied onto a release-treated polyethylene terephthalate base material having a thickness of 50 µm so that the thickness of the pressure-sensitive adhesive layer to be formed became 10 µm, followed by drying in a dryer at 120° C. for 3 minutes. Further, the top of the layer was covered with a release-treated polyethylene terephthalate film having a thickness of 38 µm.

Example 1

The release-treated polyethylene terephthalate film having a thickness of 38 µm arranged on one surface of the pressure-sensitive adhesive layer (thickness: 10 µm) obtained in Production Example 1 was peeled, and the exposed pressure-sensitive adhesive layer surface was bonded to each of both surfaces of a rolled copper foil having a thickness of 9 µm (manufactured by JX Nippon Mining & Metals Corporation, product name: "HA-V2"), followed by aging at 50° C. for 2 days. Thus, a conductive pressure-sensitive adhesive tape (double-sided pressure-sensitive adhesive tape) (1) having a thickness of 29 µm was obtained.

The results are shown in Table 1.

Example 2

The release-treated polyethylene terephthalate film having a thickness of 38 µm arranged on one surface of the pressure-sensitive adhesive layer (thickness: 10 µm) obtained in Production Example 1 was peeled, and the exposed pressure-sensitive adhesive layer surface was bonded to each of both surfaces of a rolled copper foil having a thickness of 6 µm (manufactured by JX Nippon Mining & Metals Corporation, product name: "HA-V2"), followed by aging at 50° C. for 2 days. Thus, a conductive pressure-sensitive adhesive tape (double-sided pressure-sensitive adhesive tape) (2) having a thickness of 26 µm was obtained.

The results are shown in Table 1.

Example 3

The release-treated polyethylene terephthalate film having a thickness of 38 µm arranged on one surface of the pressure-sensitive adhesive layer (thickness: 10 µm) obtained in Production Example 1 was peeled, and the exposed pressure-sensitive adhesive layer surface was bonded to each of both surfaces of a vapor-deposited copper film having a thickness of 2 µm (manufactured by Toray KP Films Inc., product name: "Vacuum Deposition film for ultra-thin foil transfer"), followed by aging at 50° C. for 2 days. Thus, a conductive pressure-sensitive adhesive tape (double-sided pressure-sensitive adhesive tape) (3) having a thickness of 22 µm was obtained.

The results are shown in Table 1.

Comparative Example 1

The release-treated polyethylene terephthalate film having a thickness of 38 µm arranged on one surface of the pressure-sensitive adhesive layer (thickness: 10 µm) obtained in Production Example 1 was peeled, and the exposed pressure-sensitive adhesive layer surface was bonded to each of both surfaces of a rolled copper foil having a thickness of 35 μm (manufactured by JX Nippon Mining & Metals Corporation, product name: "HA-V2"), followed by aging at 50° C. for 2 days. Thus, a conductive pressure-sensitive adhesive tape (double-sided pressure-sensitive adhesive tape) (C1) having a thickness of 55 μm was obtained.

The results are shown in Table 1.

Comparative Example 2

The release-treated polyethylene terephthalate film having a thickness of 38 μm arranged on one surface of the pressure-sensitive adhesive layer (thickness: 10 μm) obtained in Production Example 1 was peeled, and the exposed pressure-sensitive adhesive layer surface was bonded to each of both surfaces of a rolled copper foil having a thickness of 12 μm (manufactured by JX Nippon Mining & Metals Corporation, product name: "HA-V2"), followed by aging at 50° C. for 2 days. Thus, a conductive pressure-sensitive adhesive tape (double-sided pressure-sensitive adhesive tape) (C2) having a thickness of 32 μm was obtained.

The results are shown in Table 1.

The conductive pressure-sensitive adhesive tape of the present invention can be used in applications including a device required to have high flexibility, such as a flexible OLED or a wearable device for health care.

What is claimed is:

1. A conductive pressure-sensitive adhesive tape, comprising:
   a base material comprising a metal, the base material having a first side and a second side opposite the first side, and having a thickness from 1 μm to 9 μm;
   a first pressure-sensitive adhesive layer on the first side of the base material, the first pressure-sensitive adhesive layer having a thickness from 7 μm to 10 μm; and
   a second pressure-sensitive adhesive layer on the second side of the base material, the second pressure-sensitive adhesive layer having a thickness from 7 μm to 10 μm, wherein the tape has a total thickness of 15 μm to 29 μm.

2. The conductive pressure-sensitive adhesive tape according to claim 1, wherein at least one of the first pressure-sensitive adhesive layer or the second pressure-sensitive adhesive layer includes a conductive pressure-sensitive adhesive containing a base polymer and a conductive filler.

TABLE 1

|  | Example 1 | Example 2 | Example 3 | Comparative Example 1 | Comparative Example 2 |
|---|---|---|---|---|---|
| Thickness of base material (μm) | 9 | 6 | 2 | 35 | 12 |
| Thickness of pressure-sensitive adhesive layer (μm) | 10 | 10 | 10 | 10 | 10 |
| Total thickness of conductive pressure-sensitive adhesive tape (μm) | 29 | 26 | 22 | 55 | 32 |
| Pressure-sensitive adhesive strength (N/25 mm) | 13.0 | 13.0 | 12.0 | 18.0 | 14.0 |
| Resistance value in Z-axis direction (Ω/20 mm × 20 mm) | 0.12 | 0.35 | 0.73 | 0.10 | 0.10 |
| Resistance value in X- and Y-axis directions (Ω) | 0.5 | 0.5 | 0.9 | 0.5 | 0.7 |
| Resistance value in X- and Y-axis directions after bending test (Ω) | 2.5 | 2.5 | 2.0 | 25.0 | 10.0 |

3. The conductive pressure-sensitive adhesive tape according to claim 2, wherein a content of the conductive filler in the conductive pressure-sensitive adhesive is from 14 parts by weight to 45 parts by weight with respect to 100 parts by weight of a total solid content in the conductive pressure-sensitive adhesive except the conductive filler.

4. The conductive pressure-sensitive adhesive tape according to claim 2, wherein the conductive filler comprises a spherical and/or spike-shaped conductive filler having an aspect ratio of from 1.0 to 1.5.

5. The conductive pressure-sensitive adhesive tape according to claim 2, wherein the conductive filler comprises a metal filler and/or a metal-coated filler.

6. The conductive pressure-sensitive adhesive tape according to claim 2, wherein a particle diameter d50 of the conductive filler is smaller than a thickness of the pressure-sensitive adhesive layer.

7. The conductive pressure-sensitive adhesive tape according to claim 2, wherein the base polymer comprises an acrylic polymer.

\* \* \* \* \*